Aug. 1, 1933.

A. E. PAGE

1,920,427

AUTOMATIC MACHINE FOR MAKING PATTERNED HOSIERY

Filed Aug. 29, 1929 7 Sheets-Sheet 1

Fig. 1

Inventor
Albert E. Page
his Attorneys

Aug. 1, 1933.  A. E. PAGE  1,920,427
AUTOMATIC MACHINE FOR MAKING PATTERNED HOSIERY
Filed Aug. 29, 1929  7 Sheets-Sheet 4

Inventor
Albert E. Page
by Roberts, Cushman & Woodbury
his Attorneys

Aug. 1, 1933.  A. E. PAGE  1,920,427
AUTOMATIC MACHINE FOR MAKING PATTERNED HOSIERY
Filed Aug. 29, 1929   7 Sheets-Sheet 5

Aug. 1, 1933.　　　　　　　A. E. PAGE　　　　　　1,920,427
AUTOMATIC MACHINE FOR MAKING PATTERNED HOSIERY
Filed Aug. 29, 1929　　　7 Sheets-Sheet 6

Patented Aug. 1, 1933

1,920,427

UNITED STATES PATENT OFFICE 1,920,427

AUTOMATIC MACHINE FOR MAKING PATTERNED HOSIERY

Albert E. Page, Brooklyn, N. Y., assignor to Scott & Williams, Incorporated, New York, N. Y., a Corporation of Massachusetts Application August 29, 1929. Serial No. 389,183

24 Claims. (Cl. 66—50)

This invention relates to pattern mechanism for knitting machines. The invention is especially advantageous for use in any kind of knitting machine in which systematic, frequent or repeated change of the kind of stitch, made in parts only of the fabric, so as to make a pattern variation extending over considerable areas of an article of hosiery, is necessary or desirable.

One object of this invention is to provide for repeating the order of operation of needle-selecting devices in a stocking or other hosiery knitting machine to make a pattern of a recurring kind covering relatively large areas of the article being knit, while continuing to provide for operating other needle-selecting devices specially and serially, so as to make another extensive element of pattern, and to do this without increasing the number of instruments required for the production of simpler patterns, or making them more difficult to set up and prepare for operation or to use for knitting. For example only, this invention provides for making fabrics or stockings of which principal or substantial parts are of a repeated recurring structural pattern, such as the diagonal network or "fish-net" kind of knit fabric described and claimed in the patent to Fred Webster Smith, No. 1,772,230 dated August 5, 1930, or other frequently-repeated structural patterns, in which clocks, stripings, ornamental or strengthening areas of open or spliced or other solid fabric, and color-pattern or stitch-structure pattern variations of the fabric may be conveniently provided while continuing making of a fabric like that of said patent, or some other frequently-repeated pattern, as a background for the other ornament.

In another aspect, this invention provides devices for automatically making ornamental patterns in connection with hosiery machines automatically producing stockings having integral inturned hems or welts, and fashioned heels and toes, including machines producing their article products in separate succession. In this aspect, the invention utilizes the structure of existing machines for its new purposes without interfering with their full operation for their original function.

In another aspect this invention relates to knitting machines having devices for the operation of knitting needles according to the indications of a predetermined pattern and having selector devices controlling the movement of individual needles, and in this aspect provides improved means for determining functionally different operation for selected needles or groups of needles, capable of automatic pattern change from course to course for each needle, and pattern devices for this purpose capable of easy change or setting for variation in the particular pattern predetermined by the selector devices. In these and other aspects, this invention improves the machine described and shown in Letters Patent No. 1,678,385, for Circular knitting machines granted to Scott & Williams, Inc. as the assignee of Ivan W. Grothey on July 24, 1928, especially in relation to increasing the operative capacity of the machine to select needles for patterns of greater longitudinal extent between repeats, to make elements of varied pattern on backgrounds of fabric itself patterned, and to increase the accuracy, durability and certainty of operation of the machine devices by the improvements about to be described with reference to a preferred form of machine shown in the accompanying drawings, in which.

Figure 1:
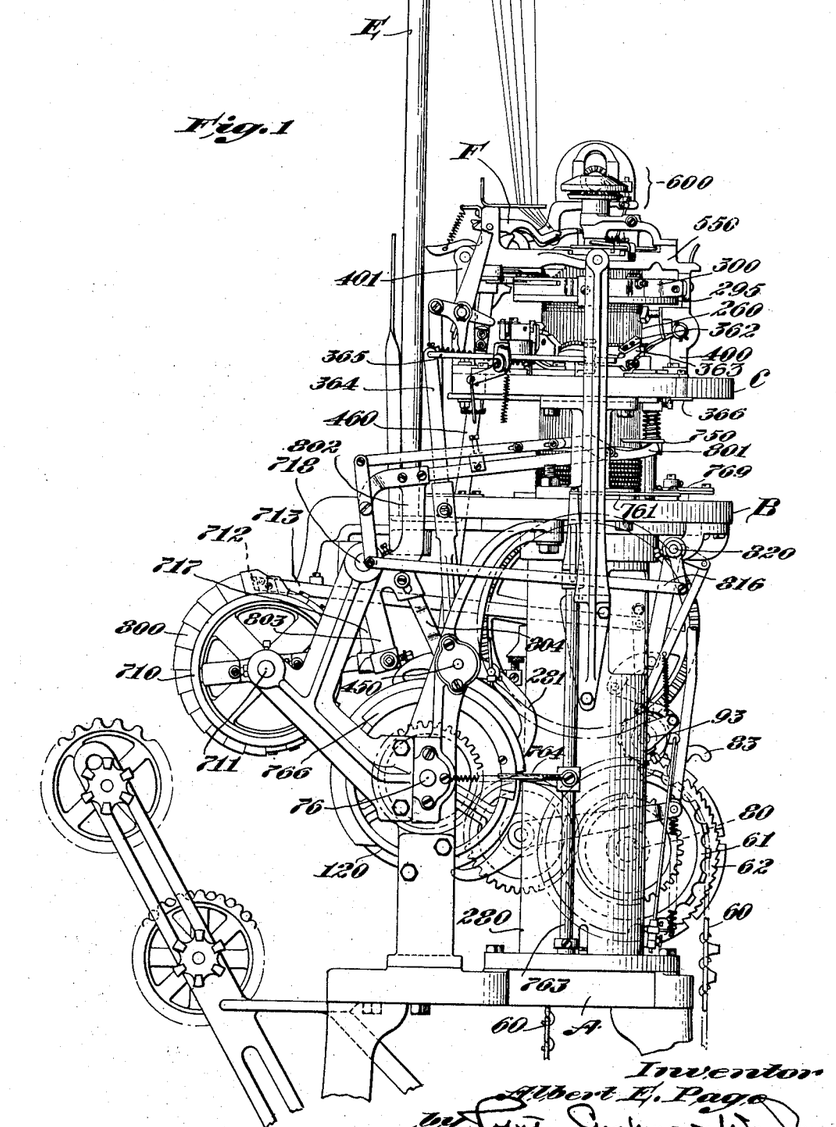
Fig. 1 is a left side elevation of a machine according to the invention as applied to one of the well known Scott & Williams machines adapted to make hosiery with inturned welts, built under the Robert W. Scott Patents Nos. 1,282,958, dated October 29, 1918; 1,256,062, dated February 12, 1918 and 1,237,256, dated August 14, 1917.
Figures 2, 2A, 2B:
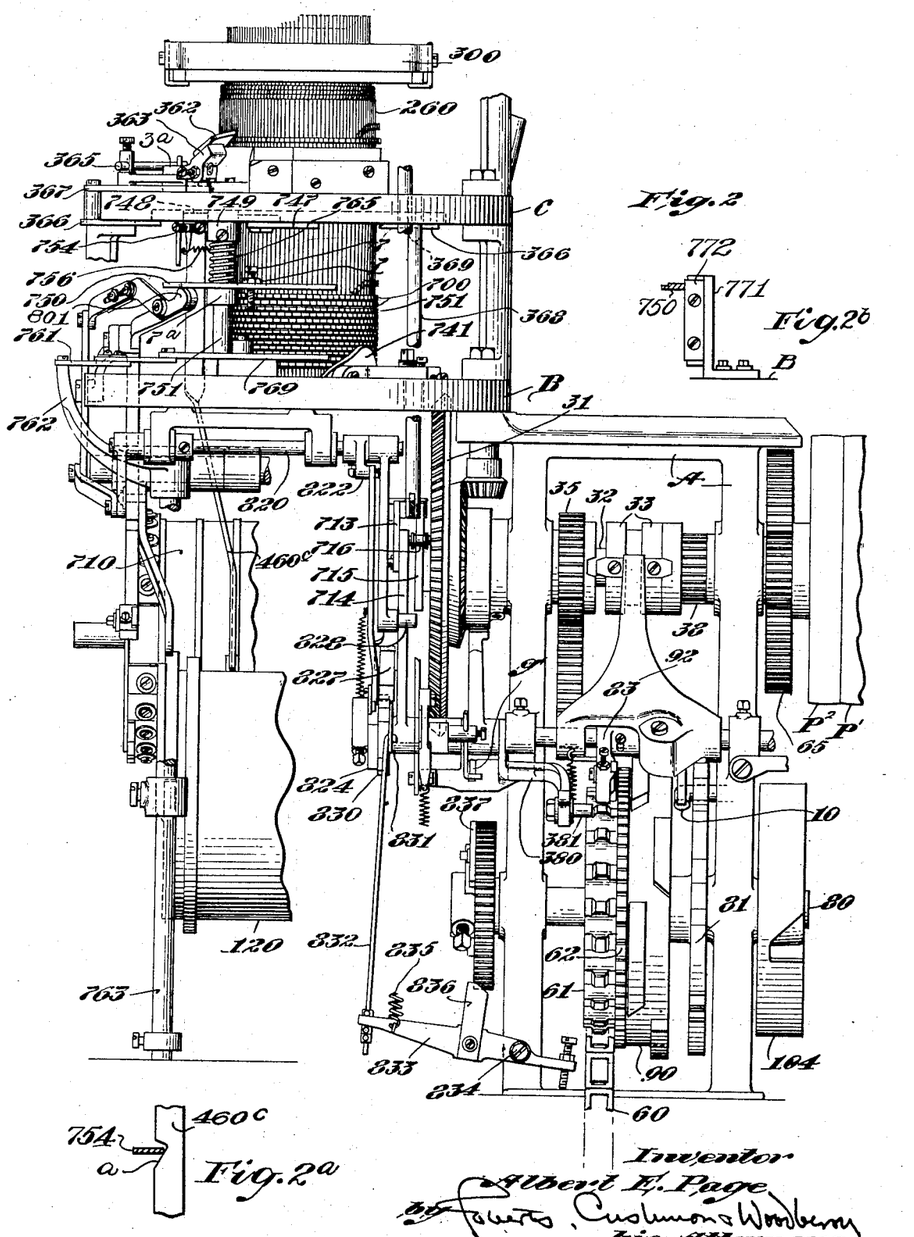
Fig. 2 is a detail front elevation of a part of the machine containing certain driving and pattern devices on an enlarged scale.
Fig. 2a is a detail in elevation of parts shown in Fig. 2.
Fig. 2b is a detail in side elevation of a part removed from Fig. 2 for clearness.
Figure 3:
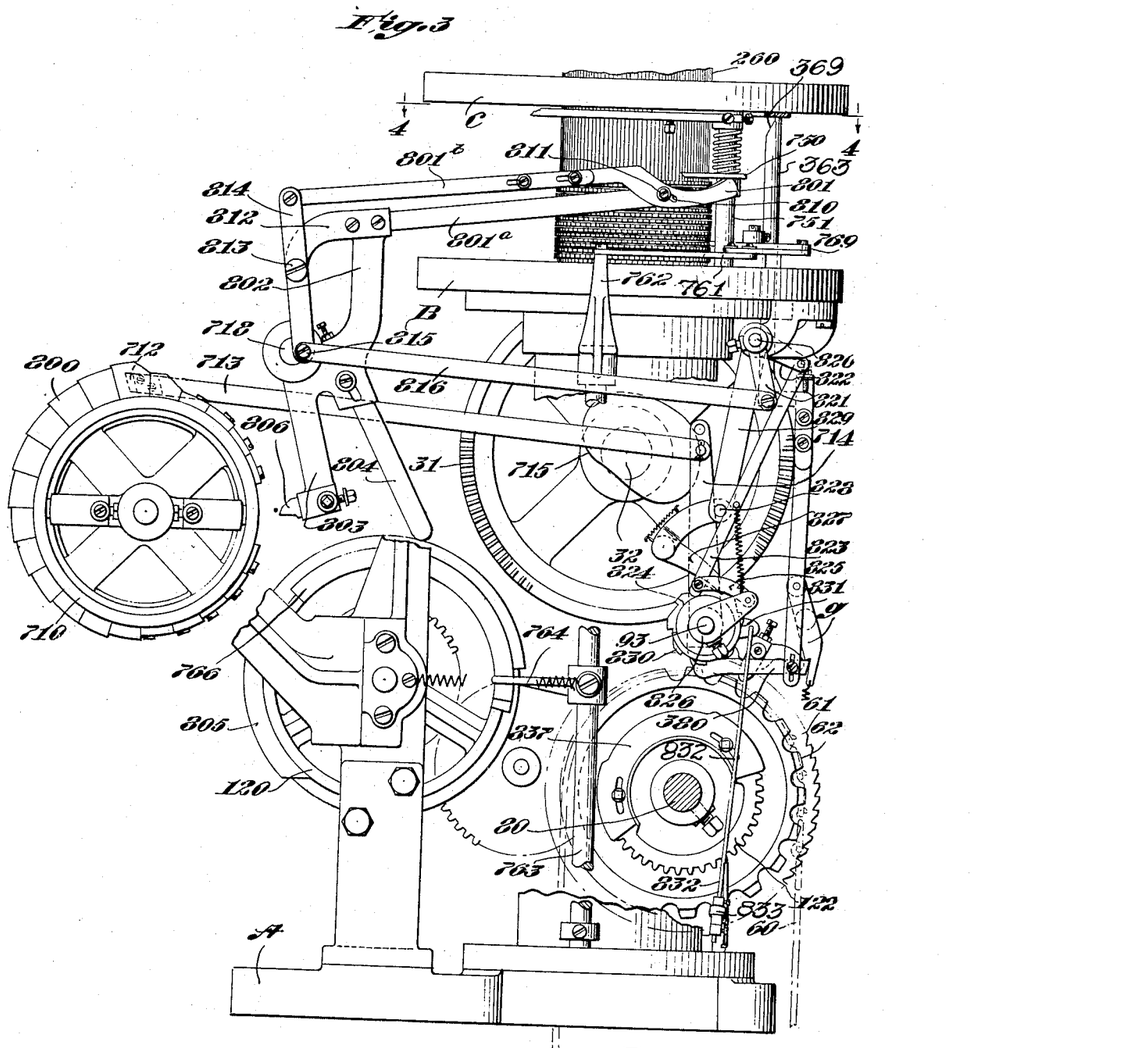
Fig. 3 is a left side elevation of the parts shown in Fig. 2.

Referring now to Figs. 1, 2 and 3, the machine may comprise in a preferred form devices for all of the usual stocking knitting functions; for example, for making in separate succession stockings having an integral inturned welt or hem begun on bare needles according to the said Scott Patent No. 1,282,958; having circular knit legs fashioned at the calf by variation of stitch-length; having usual areas of reinforced or spliced fabric, and having reciprocally knit narrowed and widened heels and toes of any desired particular construction. In general the machine comprises a frame A, Fig. 2, housing driving and power and motion changing devices, primary and main pattern devices, which frame may support an overhanging bed-plate B having a needle-carrier driver bearing therein and providing a mounting for selector device operating means; bed-plate B in turn supports a bed-plate C carrying the usual needle-controlling cams, picker mechanism, and yarn-feeding devices appurtenant to the kind of hosiery machine to which this invention may be applied. The particular devices shown are examples only of one embodiment of the invention.

Figures 7, 8:
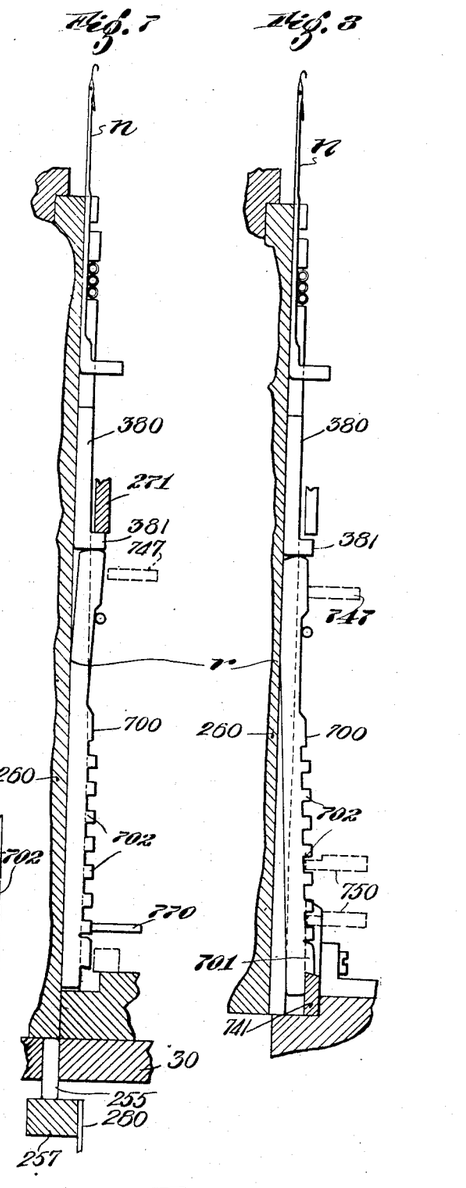
Fig. 7 is a diametrical section on an enlarged scale showing a needle carrier, needle, transmission or needle jack and selector or pattern jack.
Fig. 8 is a view similar to Fig. 7 of the same parts at a different angle of rotation of the carrier, showing a pattern jack, needle jack, and a needle about to operate to knit.

The grooved needle carrier 260 is a longer cylinder than usual for circular knitting machine needle carriers, Figs. 1, 7 and 8, providing in its tricks or grooves for the usual needles $n$, which may be any kind of needles, shown as latch-needles having their hooks forward of the rear line of their shanks; for needle jacks 380 having operating buts 381; and for pattern jacks 700, which may be jacks having a rocking point at $r$ on their backs of the kind described and claimed in said Grothey patent. The cylinder 260 may rest upon and be splined to a sleeve of and driven by the usual bevel gear ring 30, Fig. 7, rotating in a recess in bed-plate B, without change from the usual construction, which may include the free pins 255 resting on a ring 257 at the top of a hollow column 280 operated as usual to lift and lower the needle cylinder 260 for alteration of stitch length by lever 281 pivoted on a stud central at 450, and having an arm controlled by cams on a drum 120 on shaft 76 and geared to the main pattern shaft 80 to move in unison therewith.

The pattern jacks 700 are in the part of the carrier 260 exposed between the bed-plates B and C, and these jacks are thus desirably positioned to be operated upon by instruments mounted on or in the space between said bed-plates. The usual instruments for hosiery machine needle control are carried by the annular bed-plate C in their old relation, except as herein mentioned. The needles and web-holders are in the upper part of the carrier cylinder 260.

The machine may have as usual, supported above the bed-plate C on posts 400 and 401, the usual latch-ring structure 550, the usual instrument dial and its supporting and driving devices at 600; the usual yarn feed fingers F for the yarns $y$ supported, guided, tensioned, etc., in the usual overhead bracket and devices mounted on the standard E. Needle cylinder 260 carries the usual web-holder bed 295 and web-holders operated by cams in web-holder cam cap 300 and held from rotation by contact with post 400.

As usual, referring to Figs. 1, 2 and 3, the activities of the machine are in the first instance controlled by a primary pattern surface made as a mutable link chain 60 on a sprocket 61 integral with or attached to a ratchet 62 loose on main pattern shaft 80, moved forward one tooth at each several, for example four, revolutions of a main shaft 32 carrying the driving bevel gear 31 for rotating the needle cylinder. Shaft 80 carries drum 90 for shifting a yoke 92 and clutch 33 to connect shaft 32 to either the reciprocally driven pinion 35 or the rotary pinion 38, which latter may be driven by a tubular axle from pulley P', or indirectly at an increased speed by gearing 65, Fig. 2, to pulley P$^2$, all as usual. Motions of shaft 80 and drum 120, geared to it, are a consequence of the coaction of a reciprocating pawl 82, Fig. 9, worked at intervals of several revolutions of shaft 32, as usual with rack-wheel 81, as determined by a rocking pawl controller 83, Figs. 2 and 9, which is in turn positioned by lugs, not shown, on the right sides of links of the chain 60, all as usual and shown in the said Scott patents.

Figures 9, 9A:
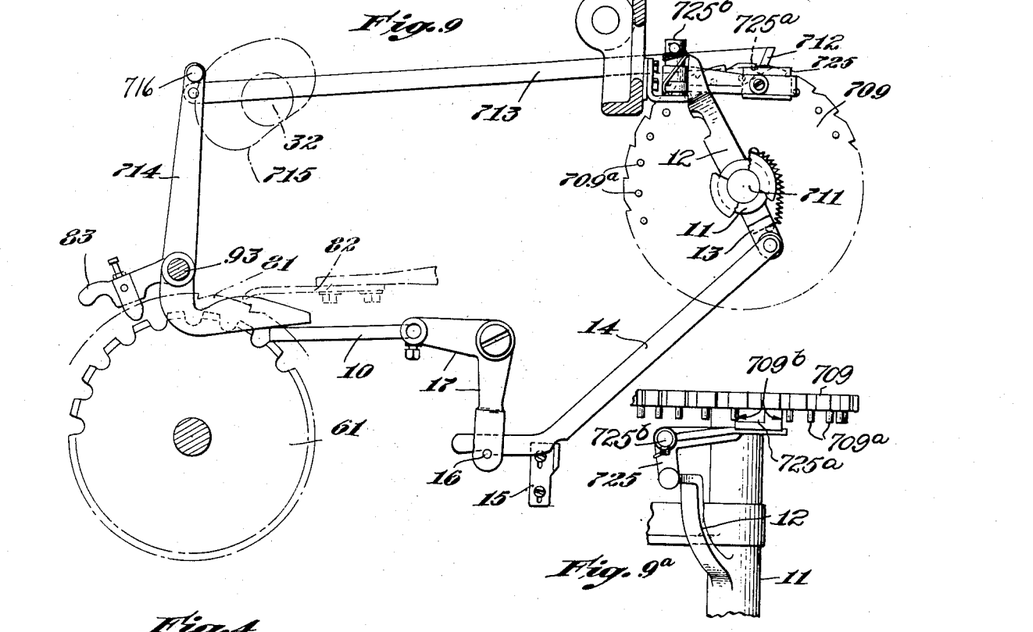
Fig. 9 is a detail right side elevation and Fig. 9ᵃ a corresponding plan showing a controlling connection from the primary pattern device to an auxiliary pattern drum.

Motions of the pawl controller 83 may be utilized, as presently explained, to operate a lever 10, Figs. 2 and 9, on an upward motion caused by a lug on the chain 60, to begin a fresh period of actuation of auxiliary pattern devices also to be presently mentioned.

Cams mounted directly on and rotating with the main pattern surface represented by the shaft 80 and its attachments, such as the cam drum 104, Fig. 2, for shifting a belt shifter, not shown, and various kinds of cams mounted on the drum 120 for motion in unison with the shaft 80 may be relied upon for the control of the devices at the knitting head or above the bed-plate C for the usual activities of the machine in knitting a stocking. The shaft 80 and the drum 120 turn through one whole revolution in the production of each article, and taking into consideration the necessary slope of cams for transmitting indications to followers to be moved by these pattern surfaces, it is difficult to provide for other or special motions for control of devices for other purposes than the normal stocking knitting purposes, without the provision of other patern surfaces. Heretofore, for example, the occasional or special motions of the yarn fingers F, especially rapid changes in order of motion of these parts for making stripes, have been delegated to auxiliary pattern surfaces; for example, as shown in Figs. 1, 2, 3 and 9, there may be mounted parallel to the axis 76 for the drum 120 at the back of the machine an auxiliary pattern drum 710 on a shaft 711, integral with or attached to a ratchet 709, Fig. 9, at the end of the drum 710 away from the observer in Figs. 1 and 3 and adapted to be racked by a pawl tooth 712 on a pawl 713, and conveniently reciprocated, as by pivoting the pawl 713 to an arm 714 having a bearing on the rod 93 and having an antifriction roll 716 held against a cam 715 on shaft 32.

The pawl 713, Figs. 9 and 9$^a$, runs in contact with a controller 725 having a cam face 725$^a$ and resting on mutable teeth or other devices such as a series of pins 709$^a$ rotating with the ratchet 709 and drum 710 and having a gap 709$^b$ or other variation which causes the pawl controller to disengage the pawl 713 from its ratchet after having turned the drum 710 a predetermined distance. The drum 710 will then be inactive until started otherwise; for example by the operation of the connection 10, Figs. 2 and 9, to the primary pattern operated controller 83, to change its position in relation to its ratchet. As shown, the connection includes a rocker sleeve 11 having an arm 12 to trip one arm of pawl controller 725, made as a horizontal bell-crank lever on a vertical pivot 725$^b$ in a bracket on frame A. Sleeve 11, Fig. 9, has an arm 13 connected to a notched link 14 adapted to engage over a pin 16 on a bell-crank 17 pivoted to frame A and carrying the connection 10 in the path of controller 83. A low lug on the chain 60 raises the foot of controller 83, causing the rear end to rock bell-crank 17 so that pin 16 moves link 14 to the right, Fig. 9, rocking sleeve 11 to cause pawl controller 725 to be withdrawn from under pawl 712. This low lug on chain 60 is not high enough to cause the main racking pawl 82, Fig. 9, to take a tooth on the rack wheel 81, to cause which requires a high lug to move controller 83. In order to prevent the high lug from withdrawing pawl controller 725 when the main pattern surface (shaft 80 and things moved by it) is moved, a cam plate 15 is fixed on frame A, in position to react with link 14 on any motion of link 14 to the right, Fig. 9, in excess of a predetermined motion required to operate pawl controller 725. Lifting the link 14 unlocks pin 16 from its notch in link 14, and allows pawl controller 725 to return into the gap between pins 709$^a$ before the pawl 712 takes into a tooth of the rack wheel 709. The pawls 712 and 82 do not have a forward operating stroke at the same time. These devices enable the auxiliary pattern drum 710 to be operated step by step by the pawl 712 and rack wheel 709 through an angle of motion, capable of being set by placing the pins 709$^a$, at times when it is impracticable because of lack of angular space for motion of shaft 80 for special functions, such as those controlled by the auxiliary drum 710, to move the main rack wheel 81, the shaft 80 and its attachments.

Cams on the drum 710, Figs. 1 and 3, may operate through the indicator levers 717, made as bell-cranks separately pivoted on a shaft 718, to work the yarn feed guides F by arms extending forwardly into notches in several of the thrust bars 460 and adapted to lift the fingers F, according to the patent to R. W. Scott No. 1,236,770, August 14, 1917. The lower ends of the bars 460 may be guided in a comb on stud shaft 450, as usual, not shown and run in contact with cams on the drum 120 for normal actuation.

Pattern cams on the main pattern surface, for example drum 120, may be relied upon to control the position in the product of the machine of the beginning and end of special operations performed with the aid of the pattern jacks 700, and cooperating devices controlling said jacks hereinafter explained, these operations themselves being controlled by cams on drum 710.

This machine is especially adapted to knit automatically predetermined structural patterns comprised of stitches, distributed anywhere about the series of needles, containing floats of one of at least two yarns caused to pass to the back of fabric; comprising at this stitch a normal, tucked, or withheld loop of the other yarn or other yarns; or patterns containing wales or series of missed stitches; or patterns having normal areas of plated fabric ornamented by patterns of stitches of the concealed yarn of the plating couple; or patterns of stripes; or patterns comprised of reinforced or spliced work in part courses of varied length; or any combination of these elements of pattern, all as hereinafter explained.

Figures 6, 12:
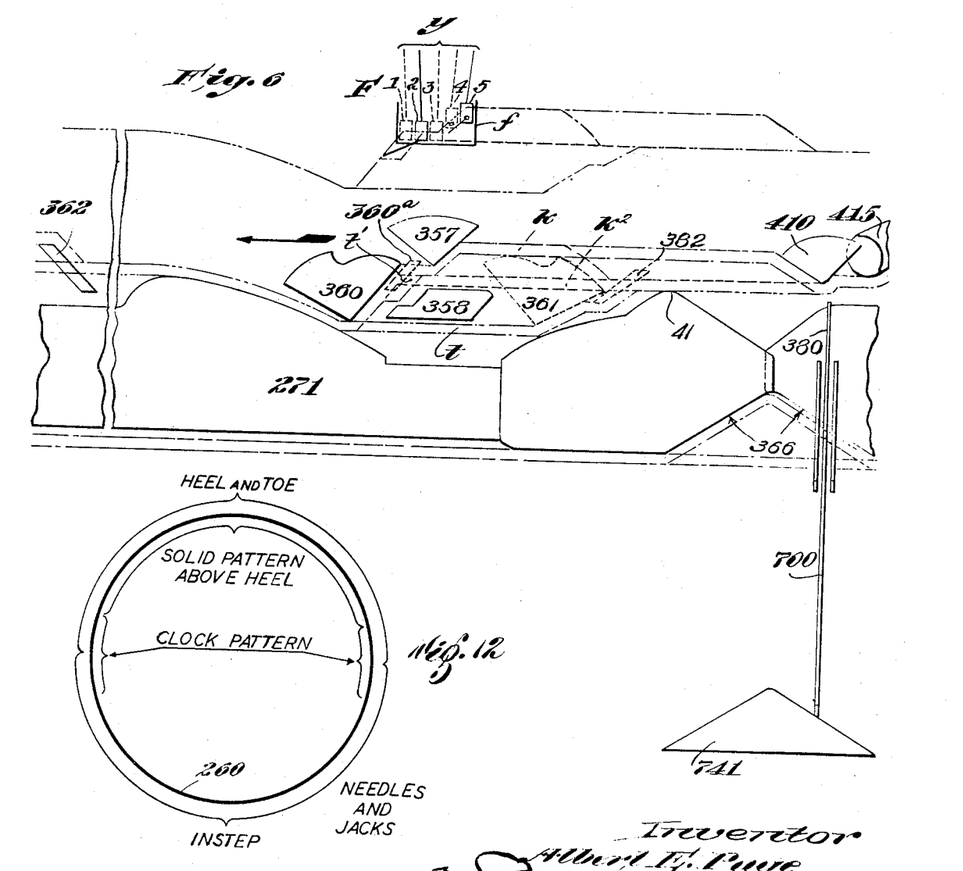
Fig. 6 is an internal development of the needle cams showing paths capable of being taken by the needles.
Fig. 12 is a diagram plan of a circle of needles (or fabric made on them) showing the places preferred for certain kinds of patterns.

Referring now to Fig. 6, which is an internal development of one preferred form of needle cams, needles having the usual operating butts may travel in the direction of the arrow during normal round and round knitting into normal contact first with the leading stitch cam 361 at the upper surface of which they clear their latches, thence down a slope of an upper center cam 357 and thence down the face of a following or active stitch cam 360, at which they knit. Needles traveling in different paths may be kept separated by a lower center came 358. In the machine improved the center cams 357 and 358 need not necessarily be movable; it is preferred not to make frequently adjustable vertically on their carriers either the stitch cam 360 or the stitch cam 361, which should affect the needles equally for satisfactory reciprocal knitting.

All of the desirable conditions for making and patterning hosiery fabrics are satisfied, cams 361 and 382 being withdrawn, by providing for a pattern controlled separation of individual needles out of their horizontal path in the tuck position (which is the position of needles at the height of the path at $k^2$ in said figure); first, to a position $k$ at which they have cleared their latches and will encounter the cams 357, 360 and knit; second, to a path $t$ under the leading stitch cam 360, so as neither to take yarn nor knit; third, to continue in path $k^2$ and to take yarn and knit only if previously cleared and if fed by yarn from a guide at a short lead and low elevation in relation to stitch cam 360; and otherwise to pass in front of the yarn fed at a longer lead, or from a higher level, or both, for the course being knit from a yarn fed at a short lead at the active stitch cam 360. By "lead" this specification refers to the distance in advance of the place at which the needles are retracted to knit from which a yarn is fed to them.

Needles taking path $k$ take a body or other yarn fed by any of the yarn fingers F operating in the yarn feeding throat $f$; for example, from any finger of the series of fingers 1, 2, 3, 4, 5, shown in Fig. 6, of which series, body yarns are usually fed from fingers 1, 2 or 3; but other needles remaining in path $k^2$ at the tuck position until their contact with the following stitch cam, will take yarn in their hooks only when fed from a finger in a position nearer to the place of retraction of the needles in a wave of motion by the stitch cam 360. Needles in path $k^2$ will then be related to a yarn fed preferably by one of the more remote yarn fingers, for instance the finger at 4 or 5 of the series F, (which, as shown, have yarn delivery eyes in ends standing when operative at a higher level than the other fingers), so as not to take but to pass in front of that yarn, which is in the hooks of needles taking path $k$ before the heads of the needles in path $k^2$ reach the entering position for that yarn in respect to the hooks of said needles in path $k^2$. If a body yarn is fed from one of the fingers 1 or 2 and a plating yarn from the fingers 4 or 5, needles remaining in path $k^2$ knit the body yarn and float the plating yarn behind them.

If the machine is provided with the usual dividing cam 382, which may be supported and operated according to the said Scott Patent No. 1,282,958, and if we assume that needles approaching in the path $k^2$ are operated so as to cause some of them to travel in the normal knitting path $k$, and the cam 382 is inserted, the needles not lifted on jacks 380 or which continue in the normal path as far as the cam 382 will be diverted under the bottom center cam 358 to a path $t$, whereupon they will pass at a low level under the center cam 358, and rejoin the other needles at the knitting point under the lower apex of the cam 360, without having taken any yarn or knit. Assuming the cam 382 to be radially withdrawn, then needles which have been taking the path $t$ will travel above the cam 361 and rejoin those in the normal path $k$ above the cam 361. If both the cam 361 and the cam 382 are withdrawn out of reach of the needle butts these needles will travel across the face of cam 361 and reach the region of cam 360 on path $k^2$ without having been lifted at the stitch cams to clear their latches; they will retain their old loops, and yarn fed at any considerable lead or from a higher elevation, or both, as from finger 5, and knit by the other needles taking the path $k$ will pass behind the needles not lifted to path $k$ as they pass down the face of the stitch cam 360 to knit. Nevertheless the needles in path $k^2$ will take yarn from fingers 1, 2 or 3 and knit if their latches have been cleared. For making float stitch patterns, not tucked, in which the facing yarn of a pair normally in plating relation passes behind a stitch of the body yarn, the needle latches are cleared before the needles reach the yarns being fed to them, as presently explained. If desired, the delivery eye of yarn finger 3 may be radially further outward from the needles than that of finger 2, and of finger 2 further outward than that of finger 1, when the delivery ends of the yarn fingers are down in operative position on the floor of throat $f$, which will cause their yarns to run to the needles from a point near the left-hand edge of throat $f$, Fig. 6.

If it is intended to have a segment of needles differentiated by their butts take the yarn from one of the yarn guides for ordinary sectional splicing (as when making a spliced sole) and to cause the other yarn not to be taken, the needles of one segment (of longer butts) may as usual be caused to be depressed ahead of the stitch cam 360, for example in the path $t'$, Fig. 6. According to one way of splicing on shorter-butt needles, an auxiliary cam 360$^a$ may be interposed for taking down the longer butts ahead of the leading face of the cam 360, so as to retract these needles parallel with the slope of the stitch cam 360 at an earlier time than otherwise, in cooperation with the usual means for working, the splicing yarn finger, for example a finger F at 1 or 2, Fig. 6, at each course. It is preferred to move cam 360$^a$ out of operative position when not operating to splice in this way on the longer butt needles as presently mentioned.

The hooks of the needles traveling in path $k^2$ do not necessarily rise higher than they are sent by the cams, as at 41, of the usual ring of cams surrounding the needles. If now a body yarn is fed at or from the bottom of throat $f$ from the guide 1, 2 or 3 of the series F and a plating yarn is fed from the guide 4 or 5 of the series F, preferably from a higher level than the body yarn, the needles not selected and moved to path $k$ which have been cleared prior to reaching the cams 361 and 382 are passed across the faces of said cams 361 and 382 in path $k^2$, and the plating yarn from guide 4 or 5 will be thrown to their backs. These needles will nevertheless take and knit yarn from fingers 1, 2 or 3, or either of them.

For the purpose of making patterns by selected needle movement, I prefer to provide severally for moving the cam 382, by the usual means of said Scott Patents, Nos. 1,282,558, 1,256,062 and 1,237,256 out of position to contact with the needles, and for moving the cam 361 radially out of position to contact with the needles, and to rely upon the jacks 380 and 700 to move to path $k$ all of those needles which take and knit both body and plating yarns. The dividing cam 382 may then be used with jack-selected needles to make a starting selvage, for holding certain needles depressed for transfer on completing a welt, or to drop stitches of previously cleared needles not lifted by a jack. If some or all of the needles in path $k^2$ have been previously moved to clear and cam 382 is removed, these needles will not tuck, but will knit with yarn from guide 1 or 2. A pattern-controlled clearing cam 362, Figs. 1, 2 and 6 on an arm 3$^a$ pivoted on bed-plate C at 363, Fig. 2, may be used to clear all needles, which are subsequently retracted to path $k^2$ and tuck position at the usual switch cam 415, and depressing cam 410, Fig. 6. Needles lifted by their jacks to path $k$ of course clear their latches on being lifted.

Figure 5:
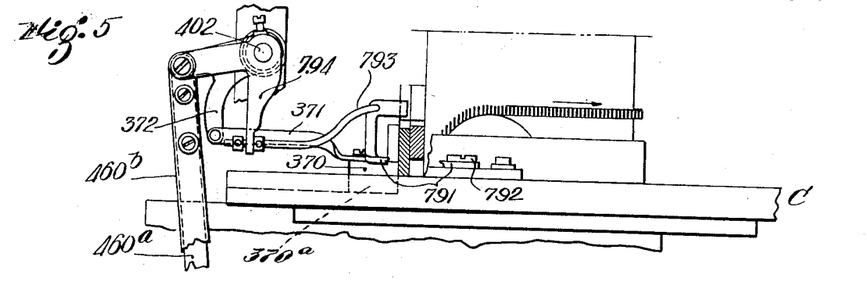
Fig. 5 is a simplified detail in left side elevation corresponding to parts of Figs. 1 and 2.

Referring to Fig. 5, leading stitch cam 361 may be moved out by causing a segment 370 of the cam-supporting ring surrounding the needle cylinder to be moved outwardly on the radial line of a point at or near the cam 361; one way of doing this is to mount on bed-plate C the segment 370, which has a guide projection 370$^a$ in a radial slot on bed C, by hold-down screws in parallel slots in the horizontal flange of the cam ring segment, not shown, and to provide a link 371 to a bell-crank lever 372 central on the projecting end of the latch ring pivot 402 to be operated by a thrust bar 460$^a$ having its lower end in contact with a cam on drum 120. Whenever a pattern represented by needles separated into series respectively moving in path $k^2$ and path $k$ is to be made, cam 361 is moved radially outward upon the initiation of making the pattern by the connection described.

Cam 360$^a$ may be similarly operated; for example, as shown in Fig. 5, this cam may be attached to or form the inner end of a rocker arm 791 pivoted on a shoulder screw 792 on bed-plate C and operated by a wire link 793, passed through a hole in one arm of a bell-crank lever 794, pivoted on the other end of the shaft 402 from the lever 372, and having an arm adapted to be operated by a thrust bar 460$^b$, also worked by a cam on drum 120 to move the cam 360$^a$ outwardly whenever its special function is not required. The cam 382, also pattern-controlled from drum 120, may be removed, whenever the cam 361 is removed, by the operating connections of the present machine.

This invention provides for making patterns in the knit fabric characterized by repeated ornamental variations within the range of changes in the fabric above mentioned, to provide a patterned background, and also provides for making patterns by similar variations displayed against the patterned background, which latter patterns may have larger or bolder figures, comprised of stitch variations extending over areas of a greater number of courses and wales than are characteristic of the background pattern.

In order to perform a selective separation of the needles before they reach the stitch cams, for such purposes, this invention provides devices for causing any selected transmission or needle jack 380 to be raised by the operation of pattern jacks 700, Figs. 7 and 8, any of which pattern jacks on each revolution of the machine may be selected to be so positioned as to cause an operating butt 701, or each of them to reach a riser cam 741, operative to lift jacks 700 and 380 thereby to cause said selective separation. The pattern jacks do not all rise upon cam 741, having been acted upon by reader cams 750 or 770 so positioned in relation to selector butts 702 on the pattern jacks as to rock inwardly the lower ends of a predetermined series only of the pattern jacks, according to the position of the reader cam and of the selector butts on each jack; the jacks 700 all having their lower ends swung out, are selected at their passage by a reader cam, which may encounter a butt on a jack or a space between butts, respectively in order to move the jack inward to miss, or leave it outward to rise at the riser cam. One of the reader cams is lowered or is lifted serially step-by-step to restore to idle position a different series of jacks for each of a number of steps controlled by cams on a cam drum, preferably the auxiliary drum 710. These devices are improvements upon the said Grothey Patent No. 1,678,385.

According to the present invention it is contrived to provide for the repeated selection of a background pattern by most of the jacks in the machine by moving a reader cam to and fro between different positions, and to rely upon serial or continued motion of a selector or reader cam upwardly or downwardly step by step to reach the different positions for butts on the jacks only when making relatively large patterns, such as clocks or patterned sectional splicings, or both. Where there is a short repeat of background pattern requiring alternation of recurrent actuation of groups of needles for a short group only of courses of the fabric, a short up-and-down motion of the reader cam may at each motion reach different orders of selector butts of sufficient variety for the pattern without much motion of the reader cam; if, for example, there is to be a longitudinal stripe such as a line of solid fabric up the back of a stocking, or the stem of a clock, both background pattern and stripe may be made by motion of the reader cam up and down through one space only. A longitudinal stripe structure may be made in any position of a reader cam along jacks having no butts within the degree of motion of the reader cam, and therefore rendering their needles active to reach the upper path $k$, Fig. 6, during repeated up-and-down short motions of the reader cam to vary the action of jacks for other needles. This invention therefore provides for back and forth motions of reader cams.

Referring to Figs. 4, 6, 7 and 8, all of the pattern jacks 700 may be rocked at each revolution to the position shown in Fig. 8, in which position they will encounter their riser cam 741 and be moved upwardly, unless interfered with before they reach cam 741, by the operation of a resetting cam 747, to move their tops inwardly and rock the lower ends outwardly. Such jacks 700 as are not to be lifted by the riser cam 741 are then acted upon to return them to the position of Fig. 7 by the reader cams 750 or 770 before they reach said riser cam 741.

Referring to Figs. 1, 2, 2ª and 4, resetting cam 747 may be attached to an arm of a lever 748 having a hub 749 fixed on the upper end of a vertical shaft 751, the other arm of lever 748 having fastened to it at 753 an extension 754, the other end of which rests against a cam notch $a$ of a twisted thrust bar 460° guided into contact with cams on the drum 120. A screw 755 taking against hub 749 capable of being locked in a hole in extension 754 provides an adjustment for the throw of cam 747, which is normally held outward by a spring 756, Fig. 2, stressing extension 754 to the right at the rear of the machine.

The machine is provided with a reader cam 770 working at a fixed elevation above the bed-plate B and having its effective end positioned to work jacks 700 after they have been moved by the resetting cam 747 and before the contact of the operating butt 701 with the cam 741, Figs. 1, 2, 4, 7 and 8. In the preferred form cam 770 is formed on the inner end of a horizontal lever 769 pivoted at 768 at a suitable height above the bed-plate B to contact with the lowermost row of butts 702 on the pattern jacks 700 (excluding the operating butt 701) when these jacks are brought to a selector level. The jacks 700 are brought to this level by the cooperation of jacks 380 riding down the slope of the cam edges 366 of the needle cam ring 271, Fig. 6, and by the subsequent action of a cam ring on the bed-plate B which may comprise such members 743, Fig. 4, as may be necessary to adjust the vertical position of the jacks 700 prior to action upon them of the resetting cam 747, the vertically fixed reader cam 770, and the vertically movable reader cam 750.

Figure 4:
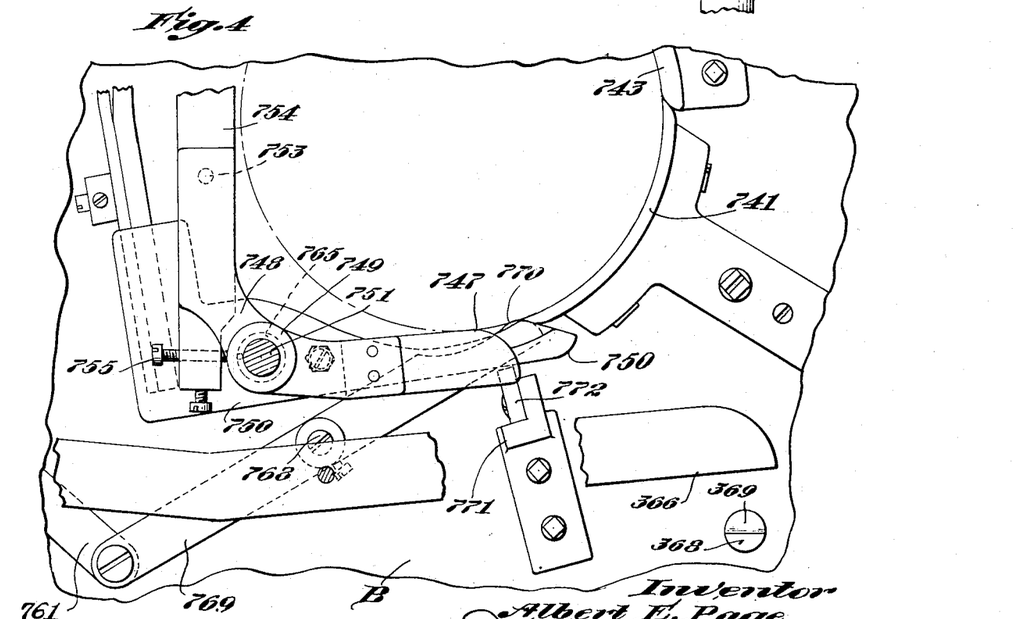
Fig. 4 is a plan partly in section on line 4—4 of Fig. 3.

The reader cam 770 may be worked outwardly and inwardly from and to the position of Figs. 4 and 7 by moving its lever 769 through any appropriate connection; as shown, Figs. 1, 2 and 3, a vertical rock shaft 763 may extend between bearings on the bed-plates A and B and have fast on its upper end an arm 762 connected by a link 761 to the lever 769. Shaft 763 may be provided with a horizontal operating arm 764 taking against the end face of drum 120 upon which a suitable cam for operating the arm 764 may be provided as shown at 766. The shaft 763 may be rocked against the cam 766 by any suitable spring.

The vertically stationary reader cam 770 may be relied upon to select and position the needles for any special purpose. For example, in the machine of said Scott Patent No. 1,282,958 it is provided to make starting selvages, to depress needles out of the way for bight taking and to make other structures by the device of dividing the needles by cam 382 to send recurrent needles under the leading stitch cam and to cause the others to take an upper path as at $k$, Fig. 6. Upon the insertion of cam 382 and feeding yarn, the needles which pass down the face of cam 382 do not take yarn and subsequently rise outside of the yarn fed, for example for the purpose of practicing the method of the Scott Patent No. 1,189,744, July 4, 1916. If now, referring to Fig. 11, whatever may be the arrangement of butts on the jacks 700, the bottom row 14 of butts presents an alternation of butts and spaces, alternate selector butts will be moved in by the cam 770 and these jacks will not rise at cam 741, whereas those without butts will not be so selected. The lowermost row of selector butts 702 may, therefore, be regarded as an instrument for performing a fixed recurring succession of selections among the needles with the aid of the reader cam 770, and independently of whatever sort of pattern indication there may be upon or among the remainder of the butts 702.

The reader cam 750, Figs. 1, 2, 2ᵇ, 3, 4 and 8, for selection of patterns may be made as a plate, thin at its end for contact with the butts of jacks 700, attached to a sliding sleeve 7ᵃ on shaft 751, and having a stop screw 7ᵇ bearing against bed-plate B and having a lock nut 7ᶜ for a lower limit stop. The sleeve 7ᵃ and reader cam 750 are urged downward by a compression spring 765 coiled about the shaft 751, and guided in the space between the face of the cylinder 260 and the interior face of a guide post 771, Figs. 2ᵇ and 4, erected on bed-plate B and provided with a separately adjustable guide plate 772, along the inner edge of which the reader cam 750 can move up and down with sufficient clearance to pass the selector butts on the jacks 700 when the lower part of said jack is rocked inward in its groove.

The reader cam 750 moves up and down on its shaft 751 in opposition to the spring 765 and under control of connections worked by a suitable pattern surface. Serial or progressive motions upward or downward, for example, of the reader cam 750 should be in steps or stages corresponding to the spaces apart of the butts 702 of the jacks 700. But for the purposes mentioned above, the cam 750 is capable of being moved at least one such distance up or down from any position, and may during times of the order of small numbers of revolutions of the machine, such as every second, third, fourth, sixth or tenth revolution, be vibrated from the level of one butt 702 to the level of the next butt 702 above or below it. Any desired order of such auxiliary reciprocal motions may be resorted to, as for example, motion of one space down, two up, one down, and repeat, and the words "vibrate" and "vibration" in this specification include repetitive motions of any to-and-fro character.

A preferred way of giving such motions to the reader cam 750 is by such a construction as best shown in Figs. 1, 2, 3 and 4, comprising a ring of replaceable stepped positioning cam blocks, shown for one type of pattern only at 800, (Fig. 1), on an auxiliary pattern surface, preferably the drum 710. Since the cam 750 is not always being moved step by step through its range of motion, it may be provided to lift the cam 750 by a lever arm 801 primarily under the control of cams on the main pattern surface 120. To this end lever 801 may be rigid with an arm 802 of a rocking lever 803 having a hub bored to rock on a fixed horizontal shaft 718, and providing a seat for a pattern cam follower arm 804 taking against a ring of cams on the surface 120. As shown in Fig 3, such a ring of cams 805 may be provided for the purpose of reacting through arm 804 to hold the lever 801, 802, 803 up until released to respond to the indications of a cam block 800 on the auxiliary drum 710. The arm 803 may as shown have an adjustable cam nose 806 for contact with cams 800 for this purpose.

For a purpose now to be explained the lever 801, which constitutes a connection from pattern mechanism to the reader cam 750, is preferably made in two parts 801ᵃ and 801ᵇ, one of which is provided with a cam, shown as a slot 810 reacting with a part shown as a shoulder screw 811 on the other part for relative motion. If the part 801ᵃ is fixed to the arm 802 longitudinal motion of the part 801ᵇ in respect to the part 801ᵃ will result in lifting or lowering the reader cam 750 through a distance predetermined by the cam slope at 810 and the length of the motion of the part 801ᵇ, whatever the position of arm 802. The distance through which cam 750 is lifted or lowered may be the difference between one or more butt spaces for the butts.

Figure 10:
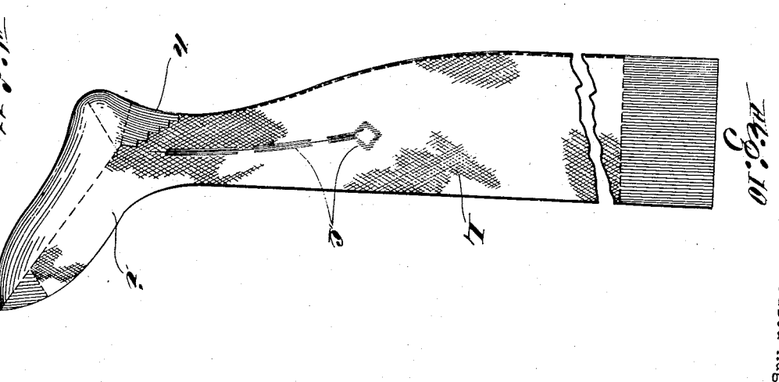
Fig. 10 is an elevation of a typical product.
Figure 11:
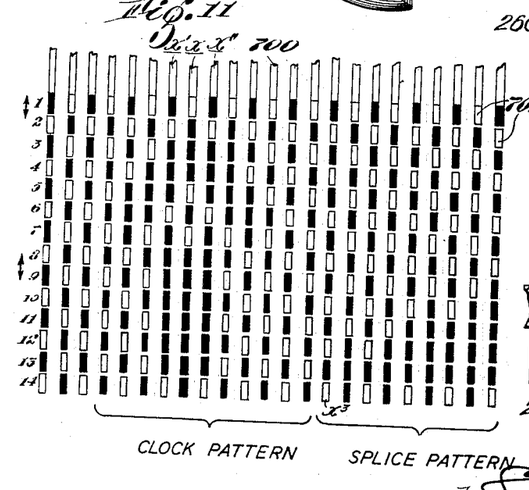
Fig. 11 is an exterior development of a detail of one arrangement of pattern jacks.

If now all the jacks 700, except those corresponding to needles desired to be operated specially for a decorative pattern, such as a pattern-edged high-spliced area $h$, Fig. 10, or an open or color-patterned or other differentiated texture mark $c$ for clock decoration, for an example only, are provided with operating butts 702 which recur in the same order at different successive levels, this order being suitable for a background pattern, the leg L and instep $i$ of the stocking, shown in Fig. 10 being intended to present a recurring pattern (such as that shown in the said Smith patent) the jacks may all be worked on motion of cam 750 from row to row of butts 702 to knit the background pattern for leg L and instep $i$ everywhere, except on needles whose jacks are placed where it is intended to make solid spliced work at $h$, or whatever texture is desired for the clock at $c$. For an open or network background fabric, it is sufficient to divide the needles between path $k$ and path $k^2$ in alternate groups of courses, the odd members of the whole series of needles taking the path $k$ for a small number of courses, for example four, and the even numbered members of the series taking that path for the next group of courses, for example four. Referring to Fig. 11, if everywhere the jacks 700 present an alternation of butts, except where a special selection of the needles is to be made for such pattern elements as those at $h$ and $c$, a vibratory up-and-down movement of cam 750 through one selector butt space will now be sufficient to select and operate the needles for the background pattern. Referring again to Fig. 11, if such a vibration up and down occurs between the butt rows 1 and 2, for example, the machine may knit a fishnet back-ground at the upper part of the leg. If such an alternation between rows occurs as between the butt levels 8 and 9 shown in Fig. 11, for the pattern there indicated, there will be a fishnet background pattern everywhere except at the needles of the jacks $x$, $x'$, $x''$, which are indicated as having no butts in rows 8 and 9. These needles will therefore be advanced to path $k$ on every course and knit a longitudinal stripe three needles wide so long as vibratory motion of the cam 750 is confined to rows 8 and 9. For other purposes, jacks such as at $x$, $x'$ and $x''$ may be provided with stripe-making spaces instead of butts through a considerable group of rows of selector butts, for example throughout the spaces extending from row 8 to row 13, Fig. 11. In this case the longitudinal stripe produced by jacks at $x$, $x'$, $x''$ will extend through all the corresponding positions of the cam 750, which can still vibrate between alternate rows without disturbing the background pattern. Serial or progressive motion of the reader cam up or down the jacks will not disturb this alternation if every motion of progress of cam 750 is from one to another of like rows of background selector butts, or occurs when a stroke of the vibratory movement takes place in an opposite sense to progressive movement, as preferred. In herein referring to the serial or progressive motion of the reader cam, it is not intended thereby to suggest the extent of such motion, nor to imply that the reader cam must move from one end of its entire path of travel to the other before starting in the opposite direction, nor that the reader cam must necessarily stop at each level of pattern indications or butts before progressing further.

As shown in the lower right-hand corner of Fig. 11, for example, the butts 702 of the jacks may be removed in numbers decreasing from row to row for the stepped edge of the area $h$, jacks for the corresponding needles in the series extending to the right from the jack marked $x^3$ having their butts removed for this purpose in an upwardly diminishing series. The effect of this is to cause downward progress of reader cam 750 to cause increasing continuous segments of needles central at the back of the stocking to be sent to the normal upper path $k$, where they knit solid fabric, whereas adjacent needles in path $k^2$ knit stitches according to the pattern set on their jacks.

It will be observed that needles selected to take the path at $k^2$, Fig. 6, by cooperation of the butts 702 and the reader cam 750 may therefore be all the needles of a segment varying from one group of courses to another to take respectively different paths with respect to the yarn fingers at the stitch cams. One of these fingers (at 4 or 5) may be positioned to float at any needle or needles one of a pair of yarns knitting elsewhere in plating relation. Needles of the different segments of the series of needles indicated in diagram in Fig. 12 may respectively be operated to knit and to float behind a single needle or small group of needles at passage of the yarn throat $f$, these results respectively following when adjacent segmental series of needles take path $k$ and path $k^2$; and when a single or a small group of needles takes path $k$, and adjacent needles take path $k^2$. A pattern for clocking at the segment so marked in Fig. 12 may thus be made according to the apparent open-mesh fabric of said Smith patent, whereas a solid pattern above the heel at the segment so marked may at the same time result from selection of needles and suitable selection of positions of the yarn feed guides. When desired the yarn fingers in throat $f$ may be moved to change their yarns, as usual.

In order to work the lever 801 to vibrate the reader cam 750 up and down so that the vibratory motion may be given whatever the vertical position of the cam 750 attained by movement of the rocker 802, 803, I prefer to move the lever element 801$^b$ by a connection pivoted close to the axial center of motion on the shaft 718, and to this end lever 802 carries a bracket 812 on which is pivoted at 813 a vertical lever 814 pivoted at 815 to an actuating link 816, which may receive its motion in any suitable way. One preferred way is to provide under the bed-plate B a rock shaft 820 having an arm 821 pivoted to link 816, and an arm 822 to be operated by a link 823, the lower end of which follows a vibrator cam 824 arranged to be turned on one end of clutch-yoke slide rod 93. Link 823 may have its lower end pivoted to an arc shaped link 825 on an arm 826 fixed on rod 93. The cam at 824 moves the rock shaft 820 at intervals of groups of courses, and for this purpose it may be operated suitably, for example by ratchet 830 and pawl 827 hung on a link pivoted at 828 on the lower end of a free arm 829 on shaft 820. Pin 828 projects into the path of the arm 714, for example, of the connection for operating the pawl 713 which is moved at every revolution of the shaft 32.

In order to avoid actuating the ratchet 830 continuously, for example during making heels and toes, welting, and at other times, pawl 827 may ride on the face of a pawl controller 831 which when rocked by a link 832 prevents the pawl 827 from taking the next tooth of the ratchet 830. Link 832 is pulled down by a lever 833, Fig. 2, pivoted on the frame at 834, stressed upwardly by spring 835, and has a follower 836 to contact with cams 837 adjustably mounted on the face of the transmission gear 122 on the main pattern shaft 80. Cam 837 prevents actuation of cam 824 during making of heels and toes, welts, or other structures not to be patterned.

The motion of the clearing cam 362 may, as mentioned above, be derived from the main pattern drum 120 through the lever 364 and link 365. The clearing cam may be utilized, however, for other purposes requiring its timed withdrawal, and for these uses mounting 363 of the cam 362 may be swung about its vertical pivot, whenever the cams on the drum 120 through the connection 364, 365 permit, by lever 366, Figs. 1, 2 and 4, pivoted on the under side of the bed-plate C and to a link 367 connected to the cam mounting. Lever 366 may be actuated by the vertical slide rod 368 having a cam notch 369 to swing the cam 362 out of contact with the needle butts. Rod 368 may be actuated in any convenient way; as shown it is controlled by the rocker 380 on a rod 93, having a follower 381, Fig. 2, in the path of lugs on the left-hand side of the pattern chain 60, said rocker reacting with the lower end of a linkage having as an element a latch $g$, Fig. 3, engaging a part of the rocker 380, and adapted to be released by a striker $g'$, Fig. 2, moving with an element of the reciprocal operating train.

Figures 13, 14, 15:
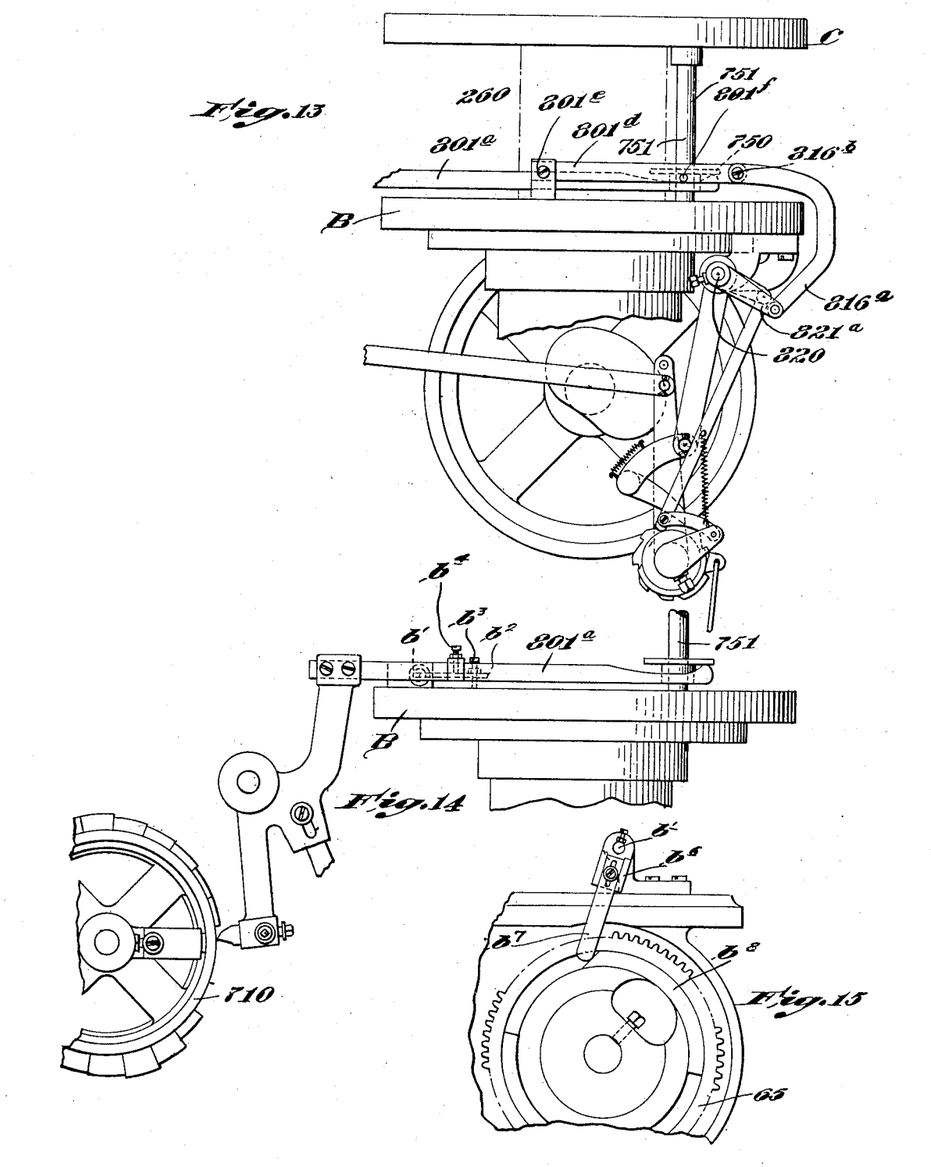
Fig. 13 is a detail view similar to Fig. 3 showing a modified operating connection.
Fig. 14 is a left side detail elevation showing a further modification.
Fig. 15 is a right side detail elevation showing an actuator for parts shown in Fig. 14.

In some cases where it is not intended to move the reader cam 750 through any long progression while providing a background by vibration between adjacent rows of jack butts, it will be sufficient to provide for vibratory movement of the cam 750 only in respect to its lowermost positions, and in that case I may resort to the simple mechanism shown in Fig. 13, in which the parts having like designation are the same as those described above, except that the lever corresponding to the lever 801 is constituted of the element 801$^a$ only, for the purpose of transmitting the indications of the pattern drum 710 to the reader cam 750. The rock shaft 820 operated as above described may still be relied upon for the vibratory motion of the reader cam, but the connection for this purpose comprises a bent link 816$^a$ pivoted to an arm 821$^a$ of shaft 820, and also pivoted at 816$^b$ to lever 801$^d$ pivoted at 801$^e$ to a lug on the bed-plate B. Projecting from the lever 801$^d$ is a pin 801$^f$ which takes under the reader cam 750 and moves it up and down on its shaft 751, according to the motion of the rock shaft 820.

Vibratory motions may be transmitted to the reader cam in still other and simpler ways; for example, the construction shown in Figs. 14 and 15 may be employed. The rigid arm 801$^a$ as described above may be retained, but this arm may be arranged to be moved when in its lower positions adjusted by stop screw $b^3$ by a rock shaft $b'$ having suitable bearings on the upper surface of the bed-plate B and having a rigid arm $b^2$ under stop screw $b^4$ on an attachment of the arm 801$^a$. Shaft $b'$ may be operated as shown in Fig. 15 by an arm $b^6$ having a follower $b^7$ in the path of cams $b^8$ mounted in concentric seats on the face of the gear 65, and therefore adapted to rock the shaft $b'$ at intervals of predetermined numbers of revolutions of the knitting head, for example two or four.

The operation of this machine having been explained in connection with the subordinate agencies in the combination, will now be apparent. The mutable pattern elements of the machine, comprising the jacks 700 having selector butts 702 may of course be arranged according to any desired pattern; characteristically the vertically movable reader cam 750 may be vibrated between the horizontal positions of adjacent horizontal rows of butts 702 in unlike arrangement throughout a segment or segments of the needle circle, for a background pattern, without disturbing the production at another segment or other segments of needles of a pattern made by a group of jacks 700 having selector butts 702 arranged in order for motions of the needles according to the gross vertical position of the reader cam 750. The periods of serial motion of the cam 750 are controlled by the coordinated effect of the main pattern surface 120 and the auxiliary pattern surface 800 of drum 710; the location and extent longitudinally of patterned areas in the article is the effect of the mutable indications on those pattern surfaces and the relative times of their automatic actuation. The lateral extent in the article of an element of pattern is the effect of the placing of the butts 702 in relation to the vertical position attained at any time by the reader cam 750, and the change from group of courses to group of courses of the operation of other individual needles than those concerned in making an element of major pattern, such as a clock or solid patch, is the effect of vibratory motion of the said cam 750 at its attained locus vertically.

It will be observed that the automatic stocking-knitting functions of the machine have been retained intact, and that the patterns made may be extensively varied according to the nature of the utilization of the vertical control of the position of each needle at its approach to the stitch cams.

I claim:

1. In a knitting machine, a grooved needle carrier, needles and jacks in said grooves, a cam for advancing said jacks and needles, means for causing relative motion between said needle carrier and jack cam, and a reader cam acting transversely on said jacks, said jacks being adapted to be positioned in said carrier according to their contact with said reader cam to position said jacks out of range of their advancing cam, selector butts on said jacks at different longitudinally-spaced positions for contact with said reader cam, means for moving the reader cam in the direction of the length of said jacks serially according to a pattern, and means for vibrating said reader cam first at one and then at another position longitudinally of said jacks through a distance corresponding to the spaces between recurrent selector butts.

2. In a knitting machine, a grooved needle carrier, needles and jacks in said grooves, a cam for advancing said jacks, and a plurality of reader cams acting transversely on said jacks, said jacks being adapted to be moved in said carrier according to their reaction with said reader cam to position said jacks out of contact with their advancing cam, selector butts on said jacks at different longitudinally-spaced positions, means for moving one at least of the reader cams in the direction of the length of said jacks serially according to a pattern, and means for vibrating said movable reader cam first at one and then at another position longitudinally of said jacks through a distance corresponding to the spaces between recurrent selector butts at intervals of a predetermined number of courses.

3. In a knitting machine the combination of needles, a carrier therefor, movable jacks in said carrier having each selector butts spaced at one or another of different distances from one end of said jack, said distances respectively being the same for a series of jacks, and an operating cam for said jacks, in combination with a reader cam acting on said selector butts adapted to be moved in the direction of the length of said jacks to position them in relation to said operating cam, means to move said reader cam step by step according to said distances serially at intervals predetermined by a pattern, and means working on the reader cam to move it at times through a predetermined distance in relation to the pattern-adjusted position.

4. In a knitting machine the combination of needles, a carrier therefor, movable jacks in said carrier having each selector butts spaced at one or another of different distances from one end of said jack for positioning said jacks, said distances respectively being the same for a series of jacks, in combination with a reader cam acting on said selector butts adapted to be moved in the direction of the lengths of said jacks, means to move said reader cam step by step according to said distances serially at intervals predetermined by a pattern, and means reacting with said reader cam to move it from one adjacent step to another and return, and cam means to operate the jacks according to their position.

5. In a knitting machine the combination of needles, a carrier therefor, rocking jacks in said carrier having each an operating butt and selector butts spaced at one or another of different distances from said operating butt, said distances respectively being the same for a series of jacks, in combination with a reader cam for contact with said selector butts adapted to be moved in the direction of the lengths of said jacks, means to move said reader cam step by step according to said distances serially at intervals predetermined by a pattern, and a lever reacting with said reader cam in any of its serial positions to move it from one adjacent step to another in respect to the position to which it is moved by said pattern-controlled means.

6. In a knitting machine the combination of needles, a carrier therefor, rocking jacks in said carrier having each an operating butt and selector butts spaced at one or another of different distances from said operating butt, said distances respectively being the same for a series of jacks, in combination with means for resetting and levelling all the jacks and a reader cam for contact with said selector butts adapted to be moved in the direction of the lengths of said jacks, means to move said reader cam step by step according to said distances serially at intervals predetermined by a pattern, a lever reacting with said reader cam to move it reciprocally when in any of its serial positions from one adjacent step to another and return in respect to the position to which it is moved by said pattern-controlled means and a cam for actuating the lever.

7. In a knitting machine, a carrier for needles and jacks, needles in said carrier and a pattern jack for each needle having an operating butt, and one or more selector butts, when present spaced at multiples of a unit distance from said operating butt, in combination with advancing means adapted to react with said operating butt when a jack is normally positioned, means for so positioning said jacks acting ahead of said advancing means, in combination with a reader cam acting on said selector butts between said position and said advancing means to position any jack having a selector butt in its range away from contact with said advancing means, means for moving said reader cam serially from time to time from one multiple of said unit distance to another in relation to the position of said jacks, means including a vibrator cam for moving said reader cam back and forth through said unit distance at intervals independent of the times of its serial advance and means for actuating the vibrator cam.

8. In a knitting machine, a carrier for needles and jacks, needles in said carrier and a pattern jack for each needle having an operating butt, and one or more selector butts, when present spaced at multiples of a unit distance from said operating butt, in combination with an advancing cam adapted to react with said operating butt when a jack is normally positioned, means for so positioning said jacks acting ahead of said advancing means, in combination with a reader cam acting on said selector butts ahead of said advancing means to move any jack according to said selector butts out of range of said advancing cam, means for moving said reader cam serially from time to time from one multiple of said unit distance to another in relation to the normal position of said jacks, and means for moving said reader cam back and forth through at least one such unit distance at intervals.

9. In a knitting machine, a carrier for needles and jacks, needles in said carrier and a pattern jack for each needle having an operating butt, and one or more selector butts, when present spaced at multiples of a unit distance from said operating butt, in combination with advancing means adapted to react with said operating butt when a jack is normally positioned, means for so positioning said jacks acting ahead of said advancing means, in combination with a reader cam acting on said selector butts between said position and said advancing means to position any jack having a selector butt in its range away from contact with said advancing means, means for moving said reader cam longitudinally of said jacks, a main pattern surface, an auxiliary pattern surface, means under the control of said main pattern surface for causing a series of motions of said auxiliary surface to be transmitted to said reader cam, and vibrator means independently actuated for moving said reader cam back and forth through at least one of said unit distances.

10. In a knitting machine, a carrier for needles and jacks, needles in said carrier and a pattern jack for each needle having an operating butt, and one or more selector butts, when present spaced at multiples of a unit distance from said operating butt, in combination with advancing means adapted to react with said operating butt when a jack is normally positioned, means for so positioning said jacks acting ahead of said advancing means, in combination with a reader cam acting on said selector butts between said position and said advancing means to position any jack according to the presence or absence of a selector butt in its range to contact or not to contact with said advancing means, means for moving said reader cam longitudinally of said jacks, a main pattern surface, an auxiliary pattern surface, means under the control of said main pattern surface for causing a series of motions of said auxiliary surface to be transmitted to said reader cam, and a vibrator cam independently actuated for moving said reader cam back and forth through at least one of said unit distances.

11. In a knitting machine having a pattern mechanism for the control of needle jacks by an element reacting with selector butts on said jacks to move the jack out of range of an operating cam, the combination of a reader cam for contact with said selector butts movable in the direction of the length of the jack, a pattern surface and a transmitting connection to said reader cam for positioning it according to the pattern, in combination with means reacting with said connection for reciprocating said reader cam between a plurality of its operative positions at intervals of a predetermined number of courses of knitting.

12. In an automatic knitting machine having needle jacks with selector butts, the combination of a primary pattern surface, a main pattern surface, means under the control of the primary pattern surface for advancing said main pattern surface by steps during the making of each article, an auxiliary pattern surface, and means under control of said primary pattern surface for causing said auxiliary pattern surface to move through a predetermined angle of advance in steps, a reader cam adapted to be moved to contact with the selector butts of needle jacks at different levels, a connection from said main pattern surface and a connection from said auxiliary pattern surface severally for positioning said reader cam, and means adapted to alter the effect of said connections to shift said reader cam operating at intervals of making a predetermined number of courses of fabric on said machine to shift said reader cam back and forth in the direction of its motion.

13. In an automatic knitting machine having needle jacks with selector butts, the combination of a primary pattern surface, a main pattern surface, means under the control of the primary pattern surface for advancing said main pattern surface by steps during the making of each article, an auxiliary pattern surface, and means under control of said primary pattern surface for causing said auxiliary pattern surface to move through a predetermined angle of advance in steps, a reader cam adapted to be moved to contact with the selector butts of needle jacks at different levels, an operating connection for said reader cam for positioning it by said main pattern surface, and an operating connection from said auxiliary pattern surface for positioning said reader cam during inactivity of said main pattern surface, and cam means coacting with said operating connections to alter the effect of said connections to shift said reader cam operating at intervals of making a predetermined number of courses of fabric on said machine to shift said reader cam back and forth in the direction of its motion.

14. In an automatic knitting machine having needle jacks with selector butts, the combination of a main pattern surface, means for advancing said main pattern surface by steps during the making of each article, an auxiliary pattern surface, and means for causing said auxiliary pattern surface to move through a predetermined angle of advance in steps, a reader cam adapted to be moved to contact with the selector butts of needle jacks at different levels, a lever adapted to be moved by said main pattern surface and by said auxiliary pattern surface severally for positioning said reader cam, and means adapted to alter the position of one end of said lever to shift said reader cam operating at intervals of making a predetermined number of courses of fabric on said machine to shift said reader cam back and forth in the direction of its motion.

15. In a pattern mechanism for knitting machines, the combination of a cam adapted to be positioned serially step by step, a lever for moving the cam, a pattern surface having cams thereon for moving the said lever, a linkage adapted to alter the position of the operating end of said lever forming a part thereof, and means having an element rotating in relation to the production of courses of fabric by the knitting machine for moving said linkage repeatedly through a distance at intervals of predetermined numbers of said courses.

16. In a pattern mechanism for knitting machines, the combination of a cam adapted to be positioned serially step by step, a lever for moving the cam, a pattern surface having cams thereon for moving the said lever, a linkage adapted to alter the position of the operating end of said lever with respect to the remainder of said lever and forming a part thereof, and means having a cam element rotating in relation to the production of courses of fabric by the knitting devices of said machine for moving said linkage repeatedly through a distance at intervals of predetermined numbers of said courses, said linkage comprising an operating connection pivoted near the axis of motion of said lever.

17. In a stocking knitting machine having means for serially moving a cam to predetermine the selection of needles for a pattern, and means for reciprocating said cam for repeating a background figure in the instep and leg of a stocking, a pattern element rotating once in the making of a stocking, a connection for vibrating said cam between two positions for the background pattern, and a stop carried by said pattern shaft for preventing actuation of said vibrating means during heel and toe knitting.

18. In a stocking knitting machine having a main and an auxiliary pattern surface and connections for serially moving a cam to predetermine the selection of needles for a pattern, and for reciprocating said cam for repeating a background figure in the instep and leg of a stocking, a pattern shaft rotating once in the making of a stocking, connections including a rotating cam for vibrating said cam between two positions for the background pattern, and a stop carried by said pattern shaft for preventing actuation of said vibrating means during heel and toe knitting.

19. In a stocking knitting machine having yarn feeding devices and devices for making stockings in separated succession having inturned welts and fashioned heels and toes, and a main pattern shaft rotating by steps once in the production of an article, devices for predetermining the selection of needles for movement to produce an ornamental pattern by changing the paths of selected needles in respect to said yarn feeding devices, said pattern devices including pattern controlled means for serially moving a reader cam, connections including a rotary element for vibrating said cam between two positions for the background pattern, and a stop carried by said pattern shaft for preventing actuation of said vibrating means during predetermined extents of knitting for making welts and other parts and during the making of heels and toes.

20. In a knitting machine the combination of needles, a carrier therefor, rocking jacks in said carrier having each an operating butt and selector butts spaced at one or another of different distances from said operating butt, said distances respectively being the same for a series of jacks, in combination with a reader cam acting on said selector butts adapted to be moved in the direction of the lengths of said jacks, means to move said reader cam step by step according to said distances serially at intervals predetermined by the pattern to be knit, and means working on the reader cam to move it at times through a predetermined distance in relation to the pattern adjusted position.

21. In a knitting machine the combination of needles, a carrier therefor, rocking jacks in said carrier having each an operating butt and selector butts spaced at one or another of different distances from said operating butt, said distances respectively being the same for a series of jacks, in combination with a reader cam acting on said selector butts adapted to be moved in the direction of the lengths of said jacks, means to move said reader cam step by step according to said distances serially at intervals predetermined by a movable pattern surface, and means including a rotating part, reacting with said reader cam to move it from one adjacent step to another and return.

22. In an automatic knitting machine a primary pattern surface and means for advancing said surface during operation of the machine, a main pattern surface, and an auxiliary pattern surface, rack wheels for said main and auxiliary surfaces, reciprocating pawls respectively for advancing said rack wheels, a controller for said main surface pawl, means on said primary surface for moving said controller to different extents, a controller for said auxiliary surface operating pawl, and a connection adapted to be moved by said controller for the primary surface pawl adapted on one extent of motion to cause operation of the auxiliary surface pawl, and on another extent of motion to cause operation of said main surface pawl.

23. In an automatic knitting machine a primary pattern surface and means for advancing said surface during operation of the machine, a main pattern surface, and an auxiliary pattern surface, rack wheels for operating said main and said auxiliary surfaces at different times, reciprocating pawls respectively for advancing said rack wheels, a controller for said main surface pawl, means on said primary surface for moving said controller to different extents, a controller for said auxiliary surface operating pawl, and a connection adapted to be moved by said controller for the primary surface pawl adapted on one extent of motion to cause operation of the auxiliary surface pawl, and on another extent of motion to move said auxiliary surface pawl controller idly and to cause operation of said main surface pawl.

24. In a device for producing knit fabrics ornamented by spliced, accumulated-loop or floated-yarn patterning effects produced by alteration of the path of needles at passage respectively of yarn feed guides and a stitch cam, the combination of devices for selecting needles to take one or another path at said yarn feed guides comprising a jack for each needle having a multiplicity of spaces for selector butts, and selector butts in rows on groups of said jacks, according to the desired lateral positions of ornamental effects, at increasing distances from like extremities of the jacks according to a serial order of change from course to course of the fabric desired for the operation of groups of needles, the jacks of said groups and other jacks having selector butts arranged in recurring rows of different orders at unlike distances from said extremities, in combination with a reader cam for coaction with said selector butts, pattern means for moving said cam serially from row to row of said selector butts at intervals of predetermined numbers of courses knit, and with means for moving said reader cam back and forth between the positions of said recurring and an intervening row of jack butts repeatedly at intervals of like numbers of courses, to produce a background pattern.

ALBERT E. PAGE.